United States Patent [19] [11] Patent Number: 4,546,724
Kiryu et al. [45] Date of Patent: Oct. 15, 1985

[54] INDUSTRIAL ROBOT HAVING A SENSOR UNIT

[75] Inventors: Kyuji Kiryu, Kawasaki; Kensuke Aizawa, Yokohama, both of Japan

[73] Assignee: Tokico, Ltd., Japan

[21] Appl. No.: 552,722

[22] Filed: Nov. 17, 1983

[30] Foreign Application Priority Data

Nov. 19, 1982 [JP] Japan ................ 57-203282

[51] Int. Cl.⁴ ................ B05B 13/06; B05B 15/10
[52] U.S. Cl. ................ 118/669; 118/696; 118/697; 118/680; 118/681; 118/323; 118/500; 414/735; 901/43; 901/47
[58] Field of Search ........... 118/681, 680, 682, 676, 118/669, 668, 684, 697, 696, 323, 500; 414/736, 735, 730, 744 A; 901/43, 44, 47, 30

[56] References Cited

U.S. PATENT DOCUMENTS

| 3,606,162 | 9/1971 | Lehmann | 118/697 |
| 3,709,190 | 1/1973 | Gottberg et al. | 118/680 |
| 4,187,454 | 2/1980 | Ito et al. | 901/43 |
| 4,239,431 | 12/1980 | Davini | 118/697 |
| 4,342,535 | 8/1982 | Bartlett et al. | 414/744 A |
| 4,342,536 | 8/1982 | Akeel et al. | 414/744 A |
| 4,357,900 | 11/1982 | Buschor | 118/681 |
| 4,409,718 | 10/1983 | Pryor | 901/44 |
| 4,423,999 | 1/1984 | Choly | 414/744 A |

FOREIGN PATENT DOCUMENTS

3145878 6/1982 Fed. Rep. of Germany .
3244053 6/1983 Fed. Rep. of Germany .
3243341 6/1983 Fed. Rep. of Germany .

Primary Examiner—Shrive P. Beck
Attorney, Agent, or Firm—Andrus, Sceales, Starke & Sawall

[57] ABSTRACT

An industrial robot comprises an arm, a driving source for driving the arm, an operation unit provided at a tip end of the arm, and a sensor unit provided at the tip end of the arm, in a vicinity of the operation unit. The sensor unit comprises a sensor for detecting a workpiece which is to be subjected to an operation carried out by the operation unit, a shutter for opening and closing a front of the sensor, and a mechanism for causing the shutter to open the front of the sensor at least while the sensor carries out a detecting operation to detect the workpiece, and for causing the shutter to close the front of the sensor at least while the operation unit carries out the operation.

8 Claims, 7 Drawing Figures

INDUSTRIAL ROBOT HAVING A SENSOR UNIT

BACKGROUND OF THE INVENTION

The present invention generally relates to industrial robots having sensor units, and more particularly to an industrial robot which comprises a nozzle for spraying a liquid and a sensor for detecting a position, and is designed so that mist, droplet, and the like in the sprayed liquid do not adhere onto the sensor which is located in the vicinity of the nozzle.

When coating paint on the inside of a box-shaped object such as a locker which has a door with a window, it is desirable to automatically and efficiently carry out the painting operation. Thus, instead of the conventional method of painting which relies on manual operation, it is conceivable to employ an industrial robot carries out the painting operation during a manufacturing process of the box-shaped object. However, if the door is already assembled onto the object during the manufacturing process before the painting process, it becomes necessary to open the door in order to paint the inside of the box-shaped object.

Hence, if an attempt is made to automate the above process by the conventional means, an independent robot must be provided in addition to the painting robot so as to open the door before the painting operation is started. However, when a playback type robot which must be taught the operations to be carried out, is used as the robot which opens the door, the door to be opened must always be located at a predetermined closed position. In this case, a stopper must be mounted on the door to keep the door in the predetermined closed position before the painting process, and the mounted stopper must be removed after the painting process, but such operations are troublesome to carry out.

Accordingly, the present inventors have developed an industrial robot which opens the door and paints the inside of the box-shaped object. This developed robot comprises a nozzle for spraying paint at a tip end of an arm, and a sensor and a engaging member respectively provided in the vicinity of the nozzle. The sensor of the robot detects the location of the door, and the engaging member engages with the door to open the door in response to the detection made by the sensor. After the door is opened, the inside of the box-shaped object is coated with the paint which is sprayed from the nozzle. According to this developed robot, the operation in which the door is opened and the operation in which the box-shaped object is painted are both carried out by the same robot, and it is unnecessary to provide an independent robot exclusively for opening the door. In addition, because the location of the door is detected by the sensor, it is possible to positively detect and open the door regardless of the location of the door on the box-shaped object which is conveyed from a preceding process by a belt conveyer.

However, the sensor of the above robot is provided in the vicinity of the nozzle. Therefore, there was a problem in that the sprayed paint easily adhered onto the sensor during the painting operation. When the sprayed paint adhered onto the sensor, the detecting function of the sensor deteriorates, and in extreme cases, the the sensor became incapable of carrying out the detection. The present inventors have thus designed the robot so that the sprayed paint and the like do not adhere onto the sensor.

SUMMARY OF THE INVENTION

Accordingly, it is a general object of the present invention to provide a novel and useful industrial robot having a sensor unit, in which the above described problems have been eliminated.

Another and more specific object of the present invention is to provide an industrial robot which has a sensor for detecting a location of a door on a box-shaped object, and is designed to open the door in response to a detection made by the sensor and thereafter carry out an operation such as an operation to paint the inside of the box-shaped object by inserting a nozzle into the box-shaped object through the opening formed by the open door.

Still another object of the present invention is to provide an industrial robot which has a nozzle for carrying out an operation such as a painting operation, and a sensor which is inserted within a region where mist of paint and the like exist, and is designed so that the mist of paint and the like do not adhere onto a detection surface of the sensor. As means for preventing the mist of paint and the like from adhering onto the detection surface of the sensor, a shutter is provided and this shutter covers the detection surface of the sensor when the sensor is not in use. Further, air purge means is provided in order to prevent the mist of paint and the like from entering the vicinity of the detection surface of the sensor.

Other objects and further features of the present invention will be apparent from the following detailed description when read in conjunction with the accompanying drawings.

DETAILED DESCRIPTION

First, description will be given with respect to an embodiment of an industrial robot according to the present invention by referring to FIGS. 1 through 4. In the present embodiment of the invention, the industrial robot is used for painting the inner surface of a locker. The operation of a main robot body 10 is controlled by a control board 11 which has manipulation switches and a control circuit, and a pressurized oil source 12. The main robot body 10 generally comprises a base 13, a turntable 14 which is rotatably provided on the upper surface of the base 13, a column 15 having its lower end swingably supported on the turntable 14, an arm 16 swingably supported on the upper end of the column 15, and pressurized oil cylinders 17 and 18 which rotate the column 15 and the arm 16.

Figure 1:
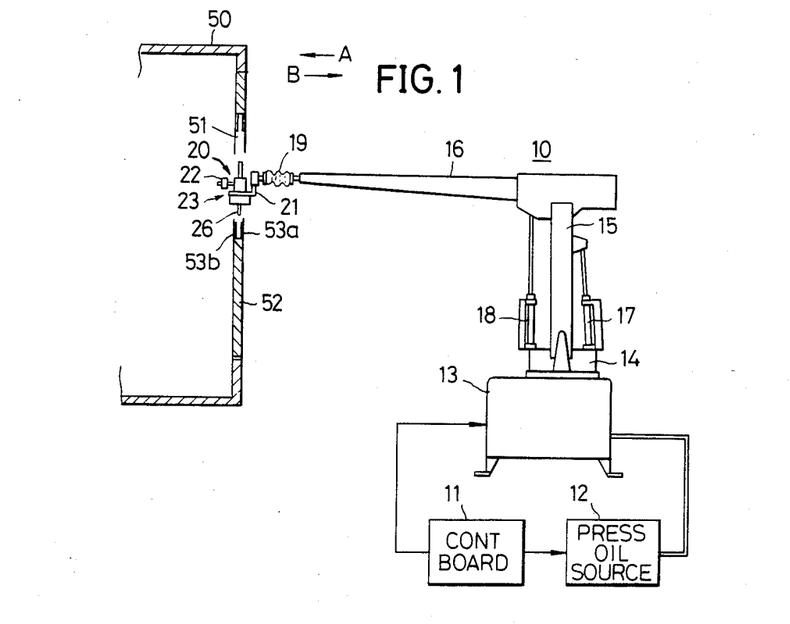
FIG. 1 is a side view showing an embodiment of an industrial robot according to the present invention.
Figure 2:
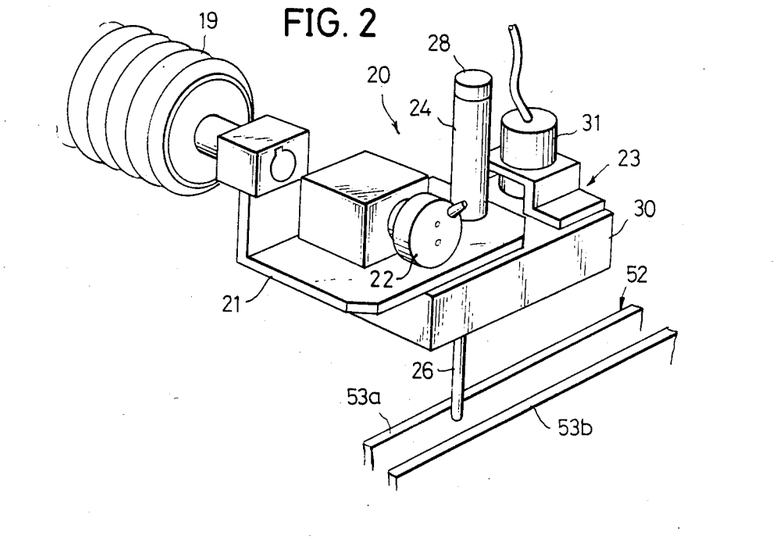
FIG. 2 is a perspective view showing a tip end part of an arm which forms an essential part of the industrial robot shown in FIG. 1.

A nozzle and sensor unit 20 is rotatably and displaceably provided at the tip end of the arm 16, through a flexible wrist 19. The unit 20 comprises a base 21. A nozzle (spray gun) 22 of a known construction for spraying paint, is provided on the base 21. In addition, a main sensor unit body 23 which will be described later on in the specification, is also provided on the base 21.

Figure 3:
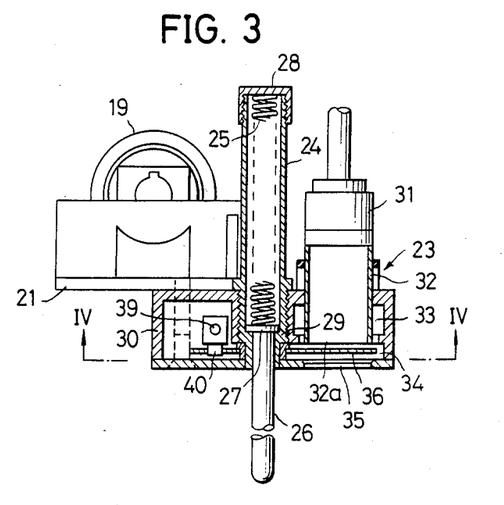
FIG. 3 is a cross sectional front view of FIG. 2.
Figure 4:
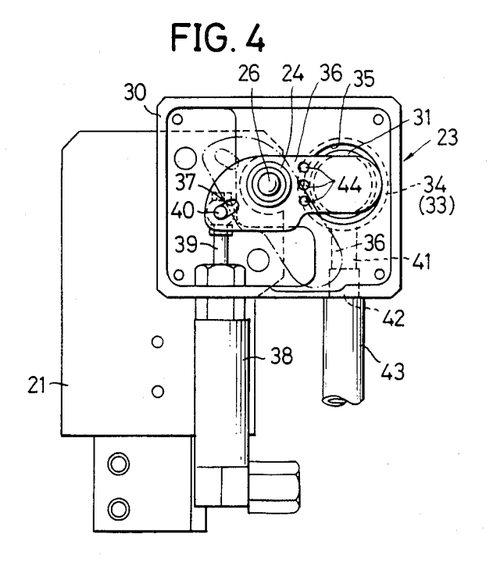
FIG. 4 is a bottom view in a horizontal cross section along a line IV—IV shown in FIG. 3.

A spring 25 is accommodated within a sleeve 24 which is provided on the base 21. A rod 26 is slidably inserted into the sleeve 24, and this rod 26 projects downward from the sleeve 24. A flange 27 is formed at the upper end of the rod 26. The rod 26 is thus urged downward by a force exerted by the spring 25 which is fitted between the flange 27 of the rod 26 and a cap 28 which covers the top end of the sleeve 24. Normally, the flange 27 is in contact with a step part 29 which is formed within the sleeve 24, and the rod 26 is in a position slid to the downward limit.

A case 30 for the main sensor unit 23, is mounted onto the lower surface of the base 21. The sleeve 24 penetrates through base 30. A sensor 31 is provided within the case 30. This sensor 31 has a known construction and comprises a light emitting element and a light receiving element. The sensor 31 detects the existence of an object which is to be detected, when the light which is emitted from the light emitting element is reflected by the object and is received by the light receiving element. A cylindrical first air chamber 33 is formed in the case 30, surrounding the lower part of a cylindrical body 32 of the sensor 31. Further, a second air chamber 34 is formed below the first air chamber 33 in the case 30. The second air chamber 34 is communicated with the first air chamber 33. Moreover, a circular opening 35 is formed in the bottom plate of the case 30, in continuous with the second air chamber 34. A lower opening 32a in the cylindrical body 32 of the sensor 31, opposes the opening 35.

A shutter plate 36 is pivotally supported on a lower part of the sleeve 24, and this shutter plate 36 is rotatable within the second air chamber 34. An elongated hole 37 is formed in one arm part of the shutter plate 36. An engaging part 40 which is provided on a tip end of a piston rod 39 in a cylinder mechanism 38, is fitted into the elongated hole 37. The engaging part 40 is relatively movable within the elongated hole 37. In a state where the piston rod 39 is receded within the cylinder mechanism 38, the shutter plate 36 assumes a position indicated by a solid line in FIG. 4, and opposes the front of the sensor 31. In other words, the shutter plate opposes the opening 32a in the cylindrical body 32 of the sensor 31, and essentially covers the opening 32a. When the cylinder mechanism 38 operates and the piston rod 39 is consequently pushed outward, the shutter plate 36 is pushed by the engaging part 40 and is rotated clockwise in FIG. 4. The shutter plate 36 hence reaches a position indicated by a one-dot chain line in FIG. 4 to separate from the position opposing the opening 32a, and opens the opening 32a to the opening 35 in the bottom plate of the case 30.

An air supply opening 42 which communicates to the first air chamber 33 through a passage 41, is provided in the case 30. Pressurized air from an air source is constantly supplied to the air supply opening 42, through an air hose 43. When the shutter plate 36 assumes the position indicated by the one-dot chain line in FIG. 4, the air supplied to the air supply opening 42 passes through the air chambers 33 and 34 and the opening 35, and is ejected outside the case 30. On the other hand, when the shutter plate 36 assumes the position indicated by the solid line in FIG. 4, the air supplied to the air supply opening 42 passes through the first air chamber 33, a gap formed between the shutter plate 36 and the second air chamber 34, and holes 44 in the shutter plate 36, and is ejected outside the case 30 through the opening 35. In the present embodiment of the invention, three holes 44 are formed so that these holes 44 are arranged in an arc along the periphery of the opening 35 when the shutter plate 36 assumes the position indicated by the solid line in FIG. 4.

As shown in FIG. 1, a workpiece which is to be painted in the present embodiment of the invention, is a locker 50. A door 52 which has a window 51, is mounted on the locker 50 so that the door 52 is free to open and close. Normally, the locker 50 is conveyed from a preceding process by a conveyer, in a state where the door 52 is closed. Window frames 53a and 53b are provided on the edges of the window 51, and a sheet of glass is fitted into these window frames 53a and 53b in a subsequent process.

Figure 5:
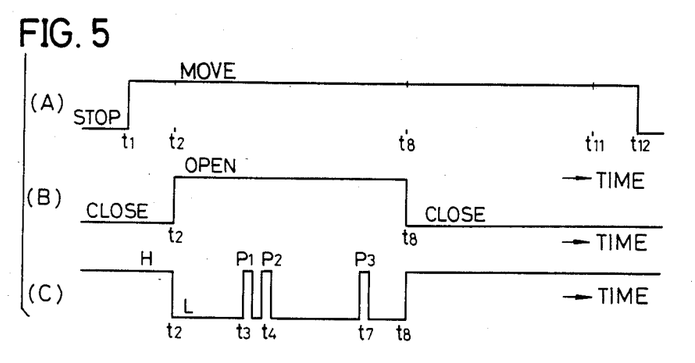
FIGS. 5(A) through 5(C) respectively are time charts for explaining the operations of a main robot body, a shutter plate, and a sensor of the industrial robot according to the present invention.

The operation of the robot according to the present invention is controlled by the control circuit in the control board 11. The operation of the robot will now be described in conjunction with FIGS. 5 and 6. The locker 50 is conveyed by the conveyer in a state where the main robot body 10 is in a stop mode as shown in FIG. 5(A). When the conveyed locker 50 reaches a predetermined position, an actuator (not shown) of a detecting device (not shown) is pushed and displayed by the locker 50, and a switch (not shown) is activated by the actuator to start the operation of the main robot body 10 at a time t1. The main robot body 10 assumes a waiting position between times t1 and t2, and the arm 16 begins to mover forward in the direction of an arrow A in FIGS. 1 and 6 at the time t2. Further, the cylinder mechanism 38 operates to push out the piston rod 39. As a result, the shutter plate 36 rotates from the position indicated by the solid line to the position indicated by the one-dot chain line, which means that the shutter plate 36 opens from the closed state as shown in FIG. 5(B). While the shutter plate 36 is closed, the light which is emitted from the light emitting element of the sensor 31 is reflected by the shutter plate 36 and reaches the light receiving element of the sensor 31. Hence, the output level of the sensor 31 remains high (H) until the time t2, as shown in FIG. 5(C). When the shutter plate 36 opens at the time t2, the light which is emitted from the light emitting element of the sensor 31 is radiated through the opening 35 and is not reflected by the shutter plate 36. In addition, because there is no object to be detected below the opening 35 in this state, the light receiving element of the sensor 31 will not receive the light which is emitted from the light emitting element of the sensor 31, and the output level of the sensor 31 is low (L).

Figure 6:
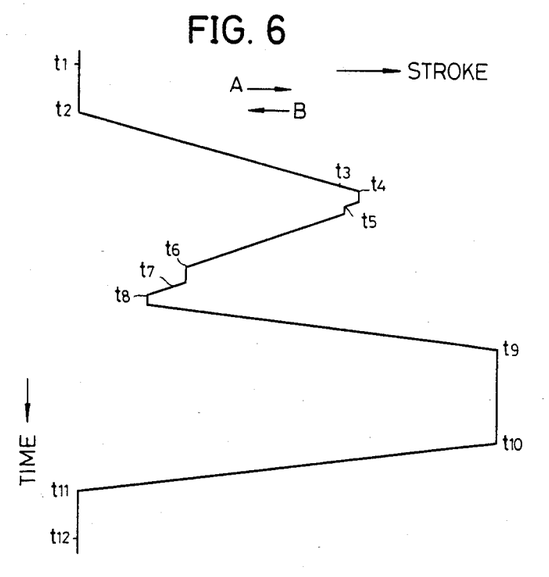
FIG. 6 is a diagram for explaining the moving stages of the arm.

FIG. 6 shows a relationship between a stroke of the arm 16 with respect to time. When the arm 16 begins to move forward in the direction of the arrow A at the time t2 to essentially assume the position shown in FIG. 1 and the unit 20 enters within the window 51 such that the sensor 31 reaches a position opposing the first window frame 53a, the light which is emitted from the light emitting element of the sensor 31 is reflected by the upper end edge of the first window frame 53a and reaches the light receiving element of the sensor 31. Accordingly, a first detection pulse P1 is produced from the sensor 31 at a time t3. Moreover, as the arm 16 further moves forward and the sensor 31 reaches a position opposing the second window frame 53b at a time t4, a second detection pulse P2 is similarly produced from the sensor 31.

In the above state, the control circuit discriminates that the window frames 53a and 53b have been detected and stops moving the arm 16 forward, and moves the arm 16 backward in the direction of an arrow B by a predetermined distance so that the rod 26 assumes a position precisely opposing a part between the window frames 53a and 53b. In this state, the output level of the sensor 31 becomes low. The arm 16 is lowered by a predetermined quantity at a time t5, and the rod 26 enters between the window frames 53a and 53b. If the arm 16 is lowered at the incorrect position due to causes such as failure of the robot and the rod 26 hits the upper end or the like of the window frames 53a and 53b, the rod 26 will compress the spring 24 and move upward. Therefore, the rod 26, the window frames 53a and 53b, and the like will be prevented from becoming damaged.

Next, the arm 16 moves backward in the direction of the arrow B in the state where the rod 26 engages with the window frame 53a, and the door 52 is opened. After the arm 16 moves backward by a predetermined distance while opening the door 52, the arm 16 stops moving at a time t6. Thereafter, the arm 16 is raised and the engagement between the rod 26 and the window frame 53a is released. In this state, as the arm 16 further rotates in the direction of the arrow B, the sensor 31 passes above the window frame 53a. Hence, the sensor 31 produces a third detection pulse P3 at a time t7. When the third detection pulse P3 is produced from the sensor 31, it is detected that the engagement between the rod 26 and the window 53a has been released.

The arm 16 stops moving at a time t8, after moving backward by a predetermined distance in the direction of the arrow B. In this state, the cylinder mechanism 38 operates so that the piston rod 39 recedes and escapes from the elongated hole 37 in the shutter plate 36. As a result, the shutter plate 36 is rotated to the position indicated by the solid line in FIG. 4, and the shutter plate 36 is close as shown in FIG. 5(B). Accordingly, the output level of the sensor 31 becomes high.

Then, the arm 16 again moves forward in the direction of the arrow A exceeding the position indicated in FIG. 1, to enter within the locker 50 through the opening formed by the open door 52. The arm 16 stops moving after moving forward by a predetermined distance, and the paint is sprayed from the nozzle 22 between times t9 and t10 so as to cover the inner surfaces of the locker 50 by the sprayed paint.

While the nozzle 22 sprays the paint, the unit 20 is exposed under a severe condition where mist of the sprayed paint fills the inside of the locker 50. However, the shutter plate 36 already assumes the position opposing the opening 32a in the cylindrical body 32 of the sensor 31 in this state, and the opening 32a is closed by the shutter plate 36. For this reason, the mist of the sprayed paint filling the inside of the locker 50, may enter through the opening 35, but will be prevented from reaching the detection surface of the sensor 31 through the opening 32a by the shutter plate 36. Thus, the undesirable effects of the mist such as deterioration in the detecting function of the sensor 31 when the mist adhered onto the detection surface of the sensor 31, and the like, will not be introduced according to the present invention. In addition, the air which is constantly supplied to the air supply opening 42, passes through the air chambers 33 and 34, the hole 44, the gap formed between the shutter plate 36 and the air chamber 34, and the like, and is ejected through the opening 35. This ejected air causes an air purge effect, and the entrance of the mist of the sprayed paint into the opening 35 is reduced.

If the hole 44 is not provided, the air which flows from the air chamber 33 to the opening 35 will be blocked, and the air flow will not be uniform. If this case, turbulence will be introduced in the air flow, and the mist of the sprayed paint is more likely to be drawn into the opening 35. However, because the hole 44 is provided, the air from the air chamber 33 not only flows throught the peripheral edge of the shutter plate 36 which is closed, but also flows through the holes 44 which are located opposing parts in the vicinity of the peripheral edge of the opening 35. Consequently, the air flow through the opening 35 becomes uniform, and the mist of the sprayed paint will not be drawn into the opening 35.

When the painting operation is completed at a time t10, the arm 16 moves backwards in the direction of the arrow B, and returns to the initial position at a time t11. The arm 16 then assumes the waiting position and the main robot body 10 assumes the stop mode at a time t12.

When actually painting the insides of a plurality of lockers successively and automatically, a plurality of lockers are successively conveyed by the conveyor, and the switch of the detecting device is activated every time a locker reaches the predetermined position described before. The robot repeats the series of operations described heretofore. In this case, the robot which has completed one cycle of the painting operation with respect to one locker between the times $t_1$ and $t_{12}$, will not assume the stop mode at the time $t_{12}$. Instead, the robot remains in the waiting mode, and then starts another cycle of the painting operation with respect to a subsequent locker which is conveyed by the conveyer.

Figure 7:
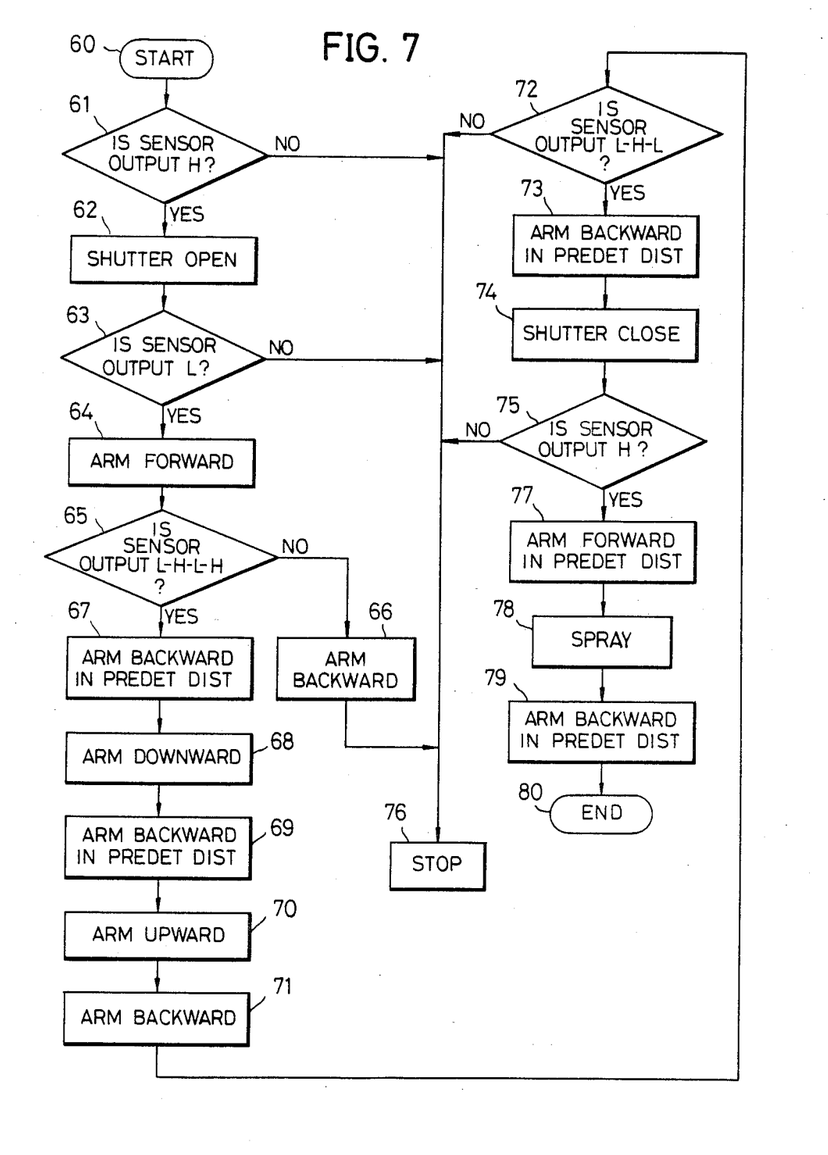
FIG. 7 is a flowchart for explaining the operation of an embodiment of a control circuit in the industrial robot according to the present invention.

Description will now be given with respect to the operation of the control circuit which controls the main robot body 10, by referring to the flowchart shown in FIG. 7. The operation of the control circuit starts in a step 60. A subsequent step 61 discriminates whether the output level of the sensor 31 is high. If the discriminated result in the step 61 is "NO", the shutter plate 36 is either closed due to failure of the mechanism which opens and closes the shutter plate 36 or due to failure of the sensor 31. Thus, when the discriminated result in the step 61 is "NO", the mode of the main robot body 10 is immediately set to the stop mode in a step 76. On the other hand, when the discriminated result in the step 61 is "YES", the shutter plate 36 is rotated and opened in a step 62. Next, a step 63 discriminates whether the output level of the sensor 31 is low. If the output level of the sensor 31 remains high and the discriminated result in the step 63 is "NO", it means that the shutter plate 36 is not open and that a failure exists. Hence, when the discriminated result in the step 63 is "NO", the mode of the main robot body 10 is set to the stop mode in the step 76. On the other hand, when the discriminated result in the step 63 is "YES", the arm 16 is moved forward in a step 64. After a predetermined time elapses from the time when the step 64 is carried out, a step 65 discriminates whether the output level of the sensor 31 has undergone a change of low-high-lowhigh, that is, whether the pulses P1 and P2 were produced from the sensor 31. If the discriminated result in the step 65 is "NO", the arm 16 is moved backward in the direction of the arrow B back to the original position in a step 66, and the mode of the main robot body 10 is set to the stop mode in the step 76.

If the discriminated result in the step 65 is "YES", the arm 16 is moved backward by a predetermined small distance in a step 67, and the arm 16 is lowered in a step 68. Thus, the rod 26 enters between the window frames 53a and 53b as described before. Next, the arm 16 is moved backward in the direction of the arrow B by a predetermined distance in a step 69. In this state, the rod 26 engages with the window frame 53a of the door 52, and opens the door 52. Thereafter, the arm 16 is raised in a step 70, and the arm 16 begins to move backwards in a step 71. A step 72 then discriminates whether the output level of the sensor 31 had undergone a change of low-high-low. If the discriminated result in the step 72 is "NO", it means that the engagement between the rod 26 and the window frame 53a has not been released, and in this case, the operation is stopped in the step 76.

If the discriminated result in the step 72 is "YES", the arm 16 is moved backward by a predetermined distance in a step 73, and the shutter plate 36 is closed in a step 74. A subsequent step 75 discriminates whether the output level of the sensor 31 has become high. If the discriminated result in the step 75 is "NO", the operation is stopped in the step 76. On the other hand, if the discriminated result in the step 75 is "YES", the arm 16 is moved forward in the direction of the arrow A by a predetermined distance in a step 77, and the nozzle 22 sprays the paint in a step 78. Thereafter, the arm 16 is moved backward by a predetermined distance in a step 79, and the operation is terminated in a step 80.

The above described operations are repeated every time the locker 50 is conveyed by the conveyer. For this reason, the mist of the sprayed paint not only exists inside the locker 50 which has been painted, but also in the vicinity of the painted locker 50. Thus, the shutter plate 36 is opened only between the times t2 and t8 when the sensor 31 must carry out the detecting operation, and the shutter plate 36 is closed after the time t8. Accordingly, the shutter plate 36 is of course closed between the times t9 and t10 when the painting operation is actually carried out, however, the shutter plate 36 is also closed between the times t8 and t9 when the arm 16 is moved forward prior to the actual painting operation and between the times t10 and t11 when the arm 16 is moved backward after the actual painting operation. Therefore, the unwanted adherence of the paint onto the sensor 31 is effectively prevented. The shutter plate 36 may also be designed to open between the times t2 and t3.

Furthermore, because air is constantly ejected through the opening 35 by way of parts in the vicinity of the opening 32a in the cylindrical body of the sensor 31, the mist of the paint is constantly and effectively prevented from entering the opening 35. Hence, the effect of preventing the adherence of the paint onto the sensor 31 is increased, due to the combined effects of the shutter plate 36 and the air ejected through the opening 35.

The various operating conditions (moving distance, operating time, and the like) for carrying out the operations described heretofore, may be preset by presetting various constants when programming the robot, and/or by teaching the robot beforehand for permanent storage of the various constants.

In the embodiment described heretofore, paint is sprayed from the nozzle 22, however, the substance to be sprayed is not limited to paint. For example, the substance to be sprayed may be a sealing agent which is to be applied to predetermined positions inside the locker. The spraying and applying of such a sealing agent is also included within the concept of "spraying and covering paint" referred to in the present application. Moreover, such a sealing agent is also included within the scope of "paint" referred to in the present specification.

In the embodiment described heretofore, the workpiece which is to be painted is a locker. However, the workpiece which is to be painted, is not limited to a locker and may be other objects.

In addition, the sensor 31 is not limited to the optical type employed in the embodiment described before. For example, the sensor 31 may be of other types such as a microwave sensor which uses microwaves for the detection.

Further, the present invention is not limited to these embodiments, but various variations and modifications may be made without departing from the scope of the present invention.

What is claimed is:

1. An industrial robot comprising an arm, a driving source for driving said arm, an operation unit provided at a tip end of said arm, said operation unit comprising a nozzle unit which sprays paint in the form of paint mist and carries out a painting operation, a sensor unit provided at the tip of said arm, in a vicinity of said operation unit, and engaing means provided at the tip end of said arm, said sensor unit comprising a sensor of a non-contact type for detecting a workpiece which is to be subjected to an operation carried out by said operation unit, said workpiece having a door which is provided with a groove defined by a pair of window frames, a shutter plate which undergoes displacement between a first position opposing a front of said sensor and a second position deviated from said front of said sensor for preventing said paint mist from entering said front of said sensor when said shutter plate assumes said first position, means for causing said shutter plate to displace from said first position at least while said sensor carries out a detecting operation to detect said workpiece, and for causing said shutter to assume said first position at least while said operation unit carries out said operation, a case for accommodating at least said front of said sensor and said shutter plate, said case being provided with an air chamber and an opening which opposes said front of said sensor, said shutter plate in said first position being located between said front of said sensor and said opening, said air chamber communicating to said opening through a region which includes said front of said sensor and the vicinity thereof, and air purge means for ejecting air in said region, said air purge means comprising means for supplying air to said air chamber, said sensor detecting one of said window frames of said workpiece and the other of said window frames while said tip end of said air is forwardly driven, said tip end of said arm being backwardly driven by a predetermined distance in response to the detection of said two window frames so that said engaging means engages with said groove, said engaging means moving said door after engaging said groove.

2. An industrial robot as claimed in claim 1 in which said shutter plate has a shape such that a gap for passing air is formed between said shutter plate and said front of said sensor when said shutter plate assumes said first position.

3. An industrial robot as claimed in claim 1 in which said shutter plate has holes for passing air formed in positions so that said air chamber and said opening are communicated when said shutter plate assumes said first position.

4. An industrial robot as claimed in claim 1 in which said engaging means engages with said groove and moves said door prior to the painting operation carried out by said operation unit.

5. An industrial robot as claimed in claim 1 in which said engaing means engages with said groove and opens said door in response to a detection of said door by said sensor, and said nozzle unit enters inside said workpiece to carry out the painting operation after said door of said workpiece is opened by said engaging means.

6. An industrial robot as claimed in claim 1 which further comprises a base which is provided at a tip end of said arm, and said operation unit, said sensor unit, and said engaging means are respectively provided on said base.

7. An industrial robot as claimed in claim 1 in which said engaging means comprises a rod, said shutter plate undergoes rotational displacement between said first position and said second position, and said shutter plate is provided coaxially with said rod of said engaging means so as to rotate around a periphery of said rod.

8. An industrial robot as claimed in claim 1 in which said engaging means comprises a slidably mounted rod and a spring which urges said rod in a predetermined direction.

* * * * *

UNITED STATES PATENT AND TRADEMARK OFFICE
CERTIFICATE OF CORRECTION

PATENT NO. : 4,546,724
DATED : October 15, 1985
INVENTOR(S) : KYUJI KIRYU ET AL

It is certified that error appears in the above-identified patent and that said Letters Patent is hereby corrected as shown below:

Column 6, Line 12-13, Cancel "If this case" and substitute therefor---In this case,---

Column 6, Line 41, Cancel "conveyer" and substitute therefor---conveyor---

Column 8, Line 65, Cancel "air" and substitute therefor---arm---

Column 9, Line 19, Cancel "engaing" and substitute therefor---engaging---.

Signed and Sealed this

Twenty-fourth Day of June 1986

[SEAL]

Attest:

DONALD J. QUIGG

Attesting Officer

Commissioner of Patents and Trademarks